(12) United States Patent
Smith et al.

(10) Patent No.: US 12,403,679 B2
(45) Date of Patent: Sep. 2, 2025

(54) LAMINATE MEDICAL FILM WITH THERMOCHROMIC INK LAYER

(71) Applicant: OLIVER HEALTHCARE PACKAGING COMPANY, Grand Rapids, MI (US)

(72) Inventors: Tommy Smith, Mullingar (IE); Lee Hyland, Enfield (IE)

(73) Assignee: OLIVER HEALTHCARE PACKAGING COMPANY, Grand Rapids, MI (US)

( * ) Notice: Subject to any disclaimer, the term of this patent is extended or adjusted under 35 U.S.C. 154(b) by 123 days.

(21) Appl. No.: 18/463,729

(22) Filed: Sep. 8, 2023

(65) Prior Publication Data

US 2024/0083149 A1    Mar. 14, 2024

Related U.S. Application Data

(60) Provisional application No. 63/375,107, filed on Sep. 9, 2022.

(51) Int. Cl.
*B32B 7/12* (2006.01)
*B32B 5/02* (2006.01)
(Continued)

(52) U.S. Cl.
CPC .............. *B32B 27/08* (2013.01); *B32B 5/022* (2013.01); *B32B 7/12* (2013.01); *B32B 27/12* (2013.01);
(Continued)

(58) Field of Classification Search
CPC .......... B32B 27/08; B32B 27/32; B32B 37/12
See application file for complete search history.

(56) References Cited

U.S. PATENT DOCUMENTS 5,524,294 A    6/1996   Richardson et al.
7,464,518 B2  12/2008   Ansinn
(Continued)

FOREIGN PATENT DOCUMENTS

AU    2015204272 B2    5/2017
EP       1995178 B1   11/2010
(Continued)

*Primary Examiner* — Elizabeth E Mulvaney
(74) *Attorney, Agent, or Firm* — McNees Wallace & Nurick LLC

(57) ABSTRACT

A laminate film, package formed from the laminate film, and method for constructing the laminate film are provided. The laminate film includes a barrier layer, sealing layer, bonding layer, and thermochromic ink layer. The thermochromic ink layer includes thermochromic ink such that the thermochromic ink is trapped between the barrier layer and sealing layer. The thermochromic ink has a first visual appearance and is adapted to permanently change to a second visual appearance upon exposure to certain pre-determined conditions during a sealing process and to maintain permanence of the second visual appearance during post-sealing processes. The package includes the laminate film, a substrate, and a packaged article. The edges of the laminate film are sealed to the substrate and form a seal. The seal forms a perimeter about the article and has the second visual appearance, including a different color, such that the integrity of the seal is quickly and confidently verifiable by an observer.

4 Claims, 2 Drawing Sheets

(51) Int. Cl.
*B32B 27/08* (2006.01)
*B32B 27/12* (2006.01)
*B32B 27/32* (2006.01)
*B32B 37/12* (2006.01)
*B65D 75/26* (2006.01)

(52) U.S. Cl.
CPC .............. *B32B 27/32* (2013.01); *B32B 37/12* (2013.01); *B65D 75/26* (2013.01); *B32B 2255/10* (2013.01); *B32B 2262/0253* (2013.01); *B32B 2307/308* (2013.01); *B32B 2307/4023* (2013.01); *B32B 2307/412* (2013.01); *B32B 2307/7376* (2023.05); *B32B 2323/04* (2013.01); *B32B 2439/46* (2013.01); *B32B 2439/80* (2013.01)

(56) References Cited

U.S. PATENT DOCUMENTS

| | | | |
|---|---|---|---|
| 9,631,726 | B2 | 4/2017 | Sabotta et al. |
| 2007/0156106 | A1* | 7/2007 | Klofta ................ A61F 13/42 |
| | | | 604/361 |
| 2008/0308613 | A1 | 12/2008 | Freder |
| 2010/0285180 | A1 | 11/2010 | Gaylor et al. |
| 2015/0225128 | A1 | 8/2015 | Luffman |
| 2016/0273972 | A1 | 9/2016 | Schmidt et al. |
| 2021/0396601 | A1* | 12/2021 | Abdo .................... C09D 5/26 |
| 2022/0280256 | A1 | 9/2022 | Dodrill |

FOREIGN PATENT DOCUMENTS

| | | |
|---|---|---|
| JP | 2017114042 A | 6/2017 |
| KR | 100887616 B1 | 3/2009 |

\* cited by examiner

LAMINATE MEDICAL FILM WITH THERMOCHROMIC INK LAYER

CROSS-REFERENCE TO RELATED APPLICATIONS

This application claims the benefit of U.S. Provisional Patent Application Ser. No. 63/375,107, filed on Sep. 9, 2022, the content of which is incorporated herein by reference in its entirety.

FIELD OF DISCLOSURE

This disclosure is directed to laminate films and more particularly to laminate films for packaging medical devices and containing thermochromic ink.

BACKGROUND

Some industries have very precise guidelines concerning the types of packaging that can be used to store certain types of goods. The medical device industry requires sterile barrier packaging solutions for single-use Class I, Class II and Class III medical devices (or components) and one common packaging format is peelable pouches that are hermetically sealed.

The integrity of the seal around the perimeter of the pouch is an area of concern; during manufacture, mechanical stresses can subject areas of the seal to distortion that may result in an imperfect seal and subsequent handling during the packaged product's lifetime may also result in the seal, and thus package's sterility, being compromised.

Accordingly, such packages are inspected at various times, including immediately prior to use. However, because medical devices are often required in dynamic, exigent environments, the time needed to carefully inspect the seal immediately prior to use is important to the medical personnel charged with using that device. Additionally, if a potential breach is suspected but can't be quickly ascertained, the product may be discarded for expediency resulting in unnecessary waste. Moreover, in other cases, some imperfections may be so small that they cannot be readily identified by visual inspection in conventional packaging.

Thus, it would be desirable to provide a film for use in medical packaging applications that can quickly and effectively communicate the integrity of a seal to an observer.

SUMMARY

The present disclosure describes various exemplary embodiments of a laminate film having thermochromic ink trapped therein. Thermochromic ink has a first visual appearance under one set of temperature conditions, which changes, temporarily or permanently, upon application of a different set of temperature conditions.

In some embodiments, a laminate film is used in forming a package for a device, e.g., a medical device, in conjunction with a substrate, and the edges of the film are sealed to the substrate via the application of temperature and pressure at the desired seal locations for a sufficient time to create a seal about the packaged device. The sealed areas change color while the rest of the film remains clear. A continuous area of unbroken color allows an observer to quickly and confidently understand that the package's seal has remained intact, while any break in the color conveys a compromise in the seal.

In other embodiments, processes for constructing a laminate film are provided.

Other features and advantages of the present invention will be apparent from the following more detailed description of exemplary embodiments, taken in conjunction with the accompanying drawings, which illustrate, by way of example, the principles of the invention.

BRIEF DESCRIPTION OF THE DRAWINGS

Wherever possible, the same reference numbers will be used throughout the drawings to represent the same parts.

DETAILED DESCRIPTION

Exemplary embodiments provide for a laminate medical film having a thermochromic ink so that when the film is subsequently used in forming a peelable pouch or other type of package, the sealed areas will change color while the rest of the film remains clear. A continuous area of unbroken color allows an observer to quickly and confidently understand that the package's seal has remained intact, while any break in the color will convey a compromise in the seal.

Figure 1:
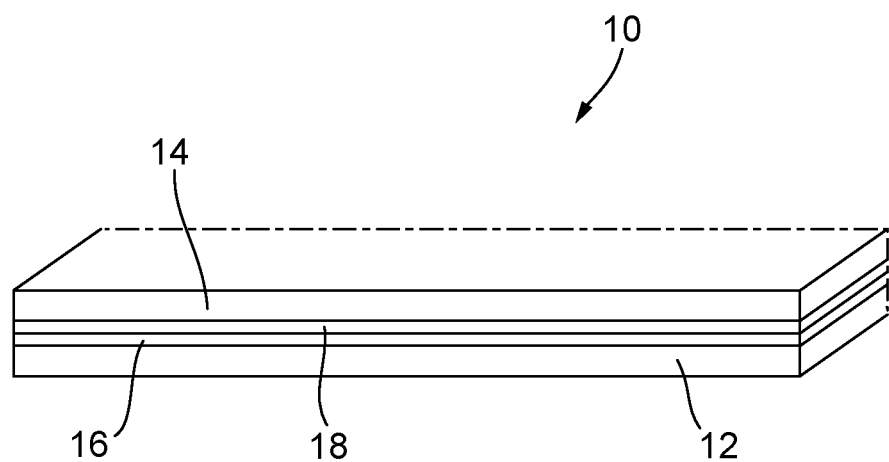
FIG. 1 is a schematic view of four layers of a portion of an exemplary laminate film.

Turning to FIG. 1, a laminate film 10 is illustrated. The film 10 includes a barrier layer 14 and a sealing layer 12 bonded together via a bonding layer 16. A thermochromic ink layer 18 is also sandwiched between the barrier layer 14 and the sealing layer 12. While illustrated as four layers, it will be appreciated that any number of additional layers may also be included in the laminate and that the barrier layer 14 and/or the sealing layer 12 may themselves be constructed from one or more different film layers.

The laminate film 10 is preferably both transparent and clear in its originally manufactured form. The film 10 may have any suitable thickness for use in flexible film packaging applications which may be, for example, between 30 microns and 300 microns.

The barrier layer 14 helps protect the package against puncture and other damage from the external environment. The barrier layer 14 may comprise a film of any suitable polymeric materials that provide a desired combination of physical and chemical properties and which are transparent and clear. Such materials are well known in the medical packaging art and may include, for example, polymers and co-polymers of polyethylene (PE), poly(ethylene terephthalate) (PET), and nylon, e.g., OPA (Polyimide nylon). In some embodiments, the barrier layer 14 has a thickness of 10 microns to 60 microns, more typically between about 20 and about 35 microns, such as about 25 microns.

The sealing layer 12 provides the film surface that faces and adheres to a substrate 40 in forming a package 100 as subsequently described in more detail with respect to FIGS. 3 and 4. As such, the sealing layer 12 may comprise a film of any suitable polymeric material selected for compatibility in light of the material of construction of the substrate to which the laminate film 10 will be sealed and that is preferably transparent and clear. In some embodiments, for example, the sealing layer 12 comprises polymers and co-polymers. A PE sealing layer 12 may be preferred, for example, when the substrate 40 comprises PE, such as when the substrate is a sheet of non-woven PE fibers, including such sheets available under the tradename TYVEK. In some embodiments, the sealing layer has a thickness of 25 microns to 75 microns, more typically about 40 microns to 65 microns, such as about 50 microns.

A bonding layer 16 is provided between the barrier layer 14 and the sealing layer 12 (and optionally between any other optional intermediate polymeric film layers) to bond those layers 12, 14 into a single, laminate film. The bonding layer is preferably transparent and clear and may be any such adhesive or other bonding material as is currently known in the art for forming laminate films for medical applications, including pressure-sensitive adhesives and hot-melt and/or heat-seal adhesives, including heat-sealable bonding films such as polyethylene, with or without a primer, and the like.

Exemplary embodiments also employ a thermochromic ink layer 18 in the film 10. Thermochromic inks are inks that have a first color or other visual appearance under one set of temperature conditions and which change, temporarily or permanently, upon application of a different set of temperature and/or pressure conditions. While thermochromic inks are generally known, such inks have cytotoxicity concerns that complicate the use of such inks in medical applications, and medical packaging in particular. Exemplary embodiments overcome the cytotoxicity concerns by printing the thermochromic ink layer 18 on an internally facing surface of one of the polymeric film constituent layers 12, 14 of the laminate film 10, trapping the ink between the layers 12, 14 of the laminate film 10 that have surfaces exposed to either the external environment or the medical device being contained. As a result, the cytotoxicity of the ink components become less critical, allowing greater flexibility in ink formulation in order to focus on thermochromic inks that demonstrate a transition from clear to a color upon exposure to certain pre-determined processing conditions during sealing and which maintain permanence of that color transition even during sterilization and other post-sealing package processing.

Figure 2:
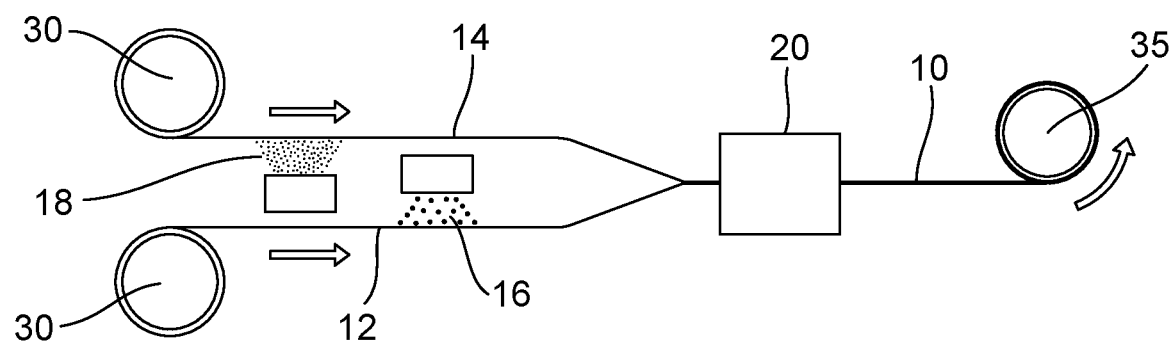
FIG. 2 is a schematic view of an exemplary process for constructing the laminate film shown in FIG. 1.

Turning to FIG. 2, a process for constructing the laminate film 10 is schematically illustrated. A web of polymeric film for forming the sealing layer 12 (e.g., PE) is pulled from a roll on a feed reel 30. In embodiments in which a liquid adhesive is used, FIG. 2 illustrates the manner in which an adhesive is spray applied to form the bonding layer 16. The bonding layer 16 may have a thickness of between 0.2 microns and 5 microns, such as about 1.5 to 4 microns, such as about 2 microns.

A second web of polymeric film containing the material of the barrier layer 14 (e.g., OPA) is also pulled from a roll mounted on an the initial feed reel 30 and on which web of film the thermochromic ink is printed to form the thermochromic ink layer 18. The thermochromic ink may be applied continuously across the full width of the second web to provide the most flexibility in subsequent converting of the laminate film for use in forming packages. Alternatively, the ink may be zone coated on certain pre-determined regions of the web when it is known prior to converting which regions of the web will be used to form the seal. In some embodiments, particularly when zone coating is employed, it may be desirable to use a thermochromic ink that has an initial tint or otherwise is not clear, in order to better see those zones where the thermochromic ink layer 18 is during converting and package formation.

The thermochromic ink may be applied to a thickness of between 0.1 microns and 5 microns, such as about 1.5 to 4 microns, such as about 2 microns. The ink may be printed using any suitable printing technique including, by way of example only, digital printing (e.g., inkjet, xerography), flexography, gravure, off-set, and screen printing.

Although shown and described with respect to application of adhesive to the sealing layer 12 and the ink to the barrier layer 14, it will be appreciated that the invention is not so limited. In some embodiments, adhesive may be applied to the barrier layer 14 and the thermochromic ink may be printed on the sealing layer 12. In other embodiments, the adhesive may be applied overlying thermochromic ink that has already been printed on the web. In still other embodiments, adhesive may be applied to both film surfaces to be bonded together to form the laminate 10. In still other embodiments in which a solid film is used for the bonding layer 16 instead of a liquid adhesive, the bonding layer 16 may be independently introduced as an independent web intermediate the sealing and barrier layers 12, 14.

The first and second (and any additional) webs are thereafter bonded together by a laminating device 20 to produce the laminate film 10. The laminating device 20 may be any suitable device for accomplishing the laminating including an extrusion or cast laminator. It will be appreciated that the type of bonding layer 16 employed may depend on the type of laminating device 20 used. For example, for extrusion laminating, the bonding layer 16 may be a polyethylene film that is independently fed into the laminating device along with the thermochromic ink printed sealing and/or barrier layer 12, 14.

The formed laminate film 10 may be wound onto a roll on a take-up reel 35 for transport and subsequent conversion at a different location. The lamination of the two webs to form the laminate film 10 is conducted under conditions to avoid activation of the thermochromic ink composition, including temperatures less than the activation temperature of the ink. In some embodiments, it is desirable to form the laminate film 10 at temperatures of about 100° C. or lower.

Additionally, although schematically illustrated as a continuous process, in some embodiments, the first or second web of film may already be pre-printed with the thermochromic ink prior to unwinding for lamination. Likewise, the first or second web may be provided with the bonding layer 16 already formed on the appropriate surface, with or without a release layer to be removed during unwinding for feeding to the laminator.

In all of the foregoing circumstances, the result is a laminate film 10 having a thermochromic ink layer 18 that is sandwiched between the barrier layer 14 and the sealing layer 12.

The roll of manufactured laminate film 10 may then be used for converting into packaging of medical, pharma and other articles where verification of seal integrity is important.

Figure 3:
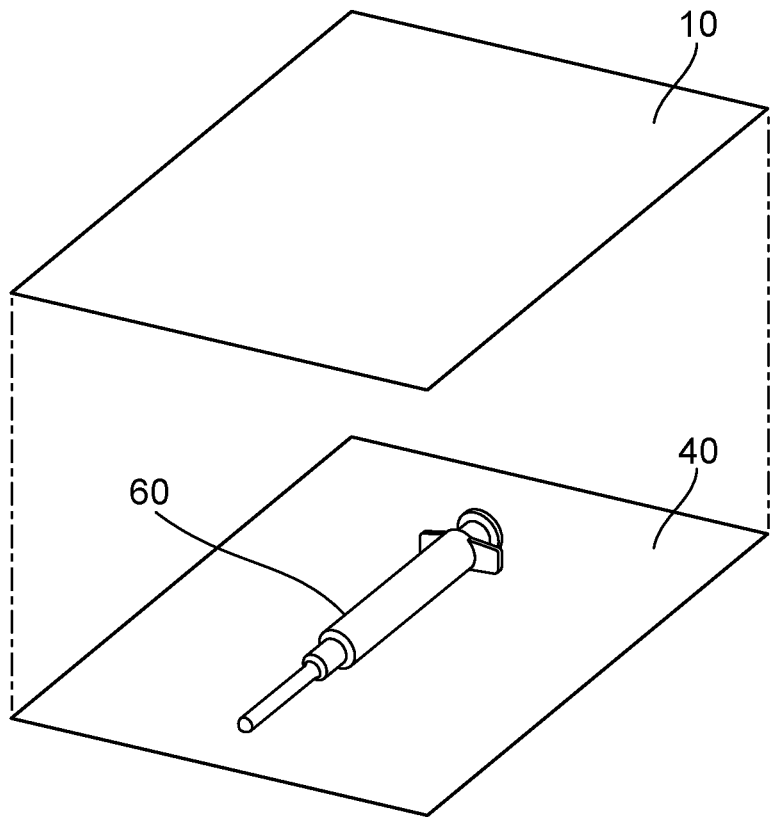
FIG. 3 is an exploded view of an exemplary package having the laminate film shown in FIG. 1, a substrate, and a medical device on the substrate.
Figure 4:
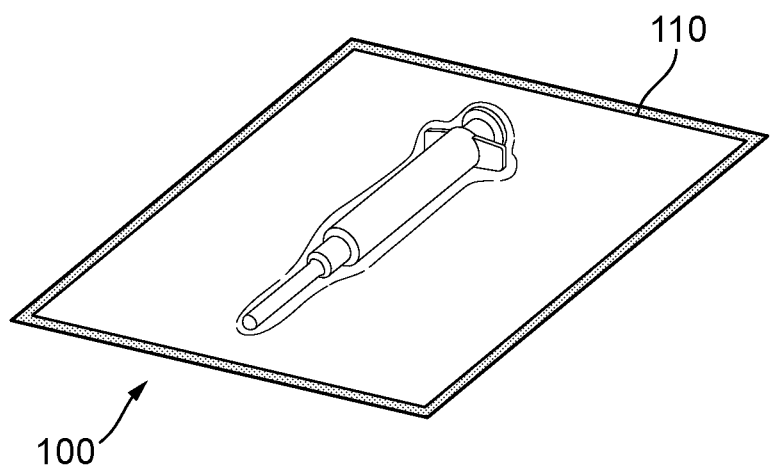
FIG. 4 is a view showing the assembled package shown in FIG. 3 and an exemplary sealed area in the assembled package showing a different color than the rest of the package.

Turning to FIGS. 3 and 4, a sheet of laminate film 10 is provided by converting to the size desired for a particular packaging operation. The film 10 is transparent and preferably clear and is provided overlying a substrate 40 on which a medical device 60 or other item to be packaged is positioned. The edges of the film 10 are sealed to the substrate 40 via the application of temperature and pressure using a die, bar sealer, or the like (not shown) at the desired seal locations for a sufficient time to create a seal in a manner as is generally known in the art that forms a perimeter seal about the packaged device 60.

In accordance with exemplary embodiments, the time and temperature of the sealing operation may be adjusted to correlate to that of the activation conditions of the thermochromic ink. Alternatively, the thermochromic ink may be formulated for activation under certain pre-determined sealing conditions, which depend at least in part on the compositions of the substrate 40 and the laminate film 10, so that the color change occurs in approximately the same amount of processing time as it takes for the sealing layer 12 of the laminate film 10 to bond with the substrate 40.

The application of heat and sufficient dwell time in the sealing process that correlates to activation conditions of the thermochromic ink provides, upon sealing, a resulting package 100 with a seal 110 about the perimeter, the integrity of which is verifiable because of the permanent change of color to the ink on those portions of the package 100 that were sealed. Breaks, gaps, or other areas of discontinuity will be more readily apparent because of a break in the color and can be more quickly identified by a user inspecting the package 100 after manufacturing and/or at various other points prior to opening the package 100 for use.

Because the thermochromic ink layer 18 is trapped within the laminate film 10, the visual advantage is achieved without the risk of cytotoxicity concerns from the ink being exposed to the device 60 within the package 100 or the person handling it. Meanwhile, those portions of the laminate film 10 that did not undergo sealing will not have been exposed to activation conditions for the thermochromic ink and thus remain clear for easy viewing and inspection of the packaging 100 contents.

It will be appreciated that in some embodiments, such as in certain medical packaging production, one or more sides of the substrate 40 and laminate film 10 may be sealed in advance to form an open pouch into which the medical device 60 can be subsequently inserted. Thereafter, the final side is sealed to close the package. Both the initial sealing and sealing the final side are under conditions sufficient to both form the seal and activate the thermochromic ink.

The substrate 40 is primarily shown and described with respect to a sheet form, such as nonwoven polymers including, for example, that available under the tradename TYVEK as discussed previously. The substrate 40 may be provided coated or uncoated, depending on the application for which the packaging will be employed.

It will further be appreciated that the substrate could also be other than a sheet form, such as a molded tray with a recess to receive a product to be packaged. In that case, the laminate film 10 is applied over the open side of the tray and then sealed at its edges.

Before and/or after sealing, the package 100 can be sterilized in a conventional manner, including, for example, via exposure to gamma radiation, steam sterilization, e-beam sterilization, hydrogen peroxide, ethylene oxide gas and combinations thereof.

While the invention has been described with reference to one or more exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention but that the invention will include all embodiments falling within the scope of the appended claims. In addition, all numerical values identified in the detailed description shall be interpreted as though the precise and approximate values are both expressly identified.

What is claimed is:

1. A package for an article comprising:
    a laminate film having edges, the laminate film including:
        a barrier layer forming a first side of the laminate film,
        a sealing layer forming a second side of the laminate film opposite the first side,
        a bonding layer bonding the sealing layer and barrier layer, and
        a thermochromic ink layer intermediate the barrier and sealing layers, the thermochromic ink layer including thermochromic ink trapped between the barrier layer and sealing layer, the thermochromic ink having a first visual appearance and adapted to permanently change to a second visual appearance, which is different from the first visual appearance, upon exposure to a pre-determined temperature; and
    a substrate,
    wherein the laminate film overlies the substrate with the sealing layer facing the substrate, at least one edge of the laminate film secured to the substrate via a seal to form an open pouch into which the article can be subsequently inserted, and;
    wherein the laminate film shows the second visual appearance of the thermochromic ink at the seal and the first visual appearance other than at the seal, the first visual appearance being clear and the second visual appearance comprising a color.

2. The package of claim 1, wherein the package further comprises the article disposed within the pouch in which the laminate film is secured to the substrate to form a closed package, the closed packaging including a sterilized space between the laminate film and substrate, the article is resident in the sterilized space, and the seal forms a perimeter about the article.

3. The package of claim 1, wherein the laminate film is transparent and clear other than at the seal.

4. The package of claim 1, wherein the substrate comprises non-woven polyethylene fibers.

* * * * *